Aug. 3, 1937.　　　J. E. ADERHOLD, JR　　　2,088,937
VALVE
Filed Sept. 21, 1934　　　2 Sheets-Sheet 1

INVENTOR.
Joseph E. Aderhold Jr.
BY
Albert J. Henderson
ATTORNEY.

INVENTOR.
Joseph E. Aderhold Jr.
BY Albert J. Henderson
ATTORNEY.

Patented Aug. 3, 1937

2,088,937

UNITED STATES PATENT OFFICE 2,088,937

VALVE

Joseph E. Aderhold, Jr., Los Angeles, Calif., assignor to Walworth Patents Inc., Boston, Mass., a corporation of Massachusetts Application September 21, 1934, Serial No. 744,895

2 Claims. (Cl. 251—93)

This invention relates to valves and more particularly to rotary plug valves having lubricated seating surfaces.

From an early period in the art of lubricated plug valves it has been deemed essential that the plug member be permitted to move from its seat in response to lubricant pressure in order to reduce the friction by increasing the clearance between the plug and its seat and to adequately lubricate the seating surfaces. Consequently, in valves thus constructed each time the plug member leaves its seat there is opportunity afforded for line fluid to leak to the seating surfaces and wash away the lubricant adhering thereto. The corrosive and erosive action of this leakage fluid on the seating surfaces necessitates the use of large quantities of lubricant to form a seal.

Furthermore, the provision for lifting or jacking of the plug member is commonly made by utilizing a packing arrangement which performs the double function of preventing leakage and resiliently seating the plug. Hence the force necessary to seat the plug when applied through the packing renders the friction exerted thereby much greater than it would be were the packing used solely to prevent leakage. If the pressure on the packing is relieved to decrease this friction the plug will rise in its seat under line pressure and thus frictionally engage with its retaining plate or bonnet rendering the plug even harder to rotate.

A primary object of this invention is to facilitate the operation of a valve while maintaining the plug member firmly in its seat.

Another object of the invention is to reduce the friction between the plug and its holding down means to facilitate rotation of said plug.

Another object of this invention is to render a minimum amount of lubricant necessary to seal the valve and reduce friction between the plug and its seat.

Another object of the invention is to prevent undue wear on the plug and seat.

Another object of this invention is to maintain the valve packing under a pressure suitable for its leakage preventing function.

Another object of this invention is to eliminate destruction of the packing from constant changes in the amount of compression thereon.

Another object of the invention is to render the plug seating means readily accessible and easy to maintain in good condition.

Other objects and advantages will become apparent from the following description taken in connection with the accompanying drawings wherein.

Figure 1:
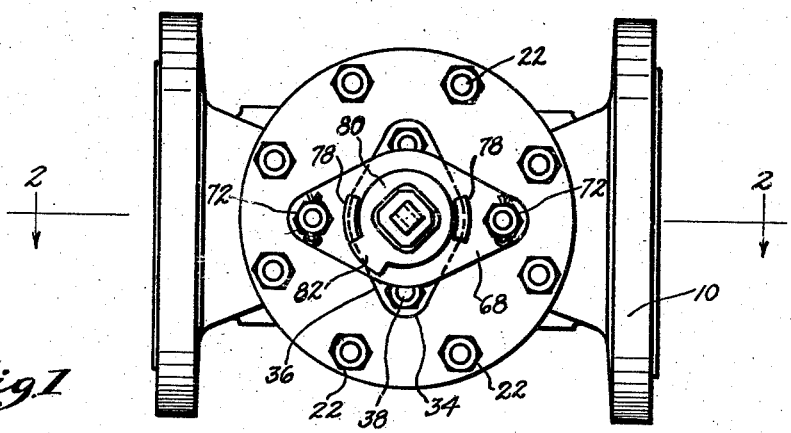
Fig. 1 is a plan view of a valve embodying the invention.
Figure 2:
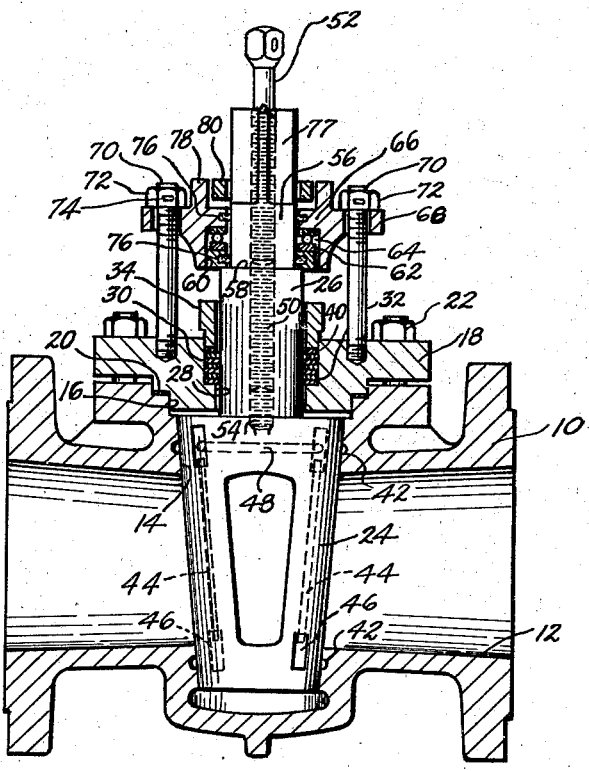
Fig. 2 is a section taken on the line 2—2 of Fig. 1 and looking in the direction indicated by the arrows.

Referring more particularly to the drawings the valve shown in Figs. 1 and 2 comprises a body 10 having the usual passageway 12 for fluid and being provided with a tapered valve seat 14 extending transversely of the passageway 12. The larger end of the valve seat 14 is provided with a stepped recess 16 for the reception of an annular cover 18 the underside of said cover being spaced from the bottom of the recess 16 as shown. Preferably a gasket 20 is interposed between the cover 18 and one face of the stepped recess 16 as shown. The usual bolts 22 spaced around a circle on the body 10 may be employed for securing the cover 18 in position on the body.

Seated in the body 10 and rotatably engaging the valve seat 14 is a tapered plug member 24 having a stem 26 extending loosely through a suitable aperture 28 in the cover 18. The shoulder defined by said stem preferably lies flush with the bottom of recess 16 and, in like manner, is spaced from the underside of the cover 18. The aperture 28 is enlarged for a portion of its length to form a stuffing box 30 within which a plurality of packing rings 32 may be compressed by means of the packing gland 34 loosely mounted on the stem. The gland 34 is provided with a substantially elliptical head portion 36 through the major axis of which extend adjusting bolts 38.

Although the packing 32 is described and shown as being in the form of a plurality of thin rings or gaskets it will be understood that other types of packing such as metallic, composition, braided or plastic in solid, shredded or other well known forms may be used with equal facility. In the present instance it is desirable that the packing rings 32 closely engage both the wall of the stuffing box 30 and the plug stem 26 and such a construction has been found advantageous in preventing leakage. Between the packing gland 34 and the packing 32 there may be interposed a metal gasket 40 serving to retain the packing in position. It will furthermore be noted that the bottom face of the stuffing box 30 and the bottom face of the gland 34 are perpendicular to the direction in which the compressive action of the gland 34 is delivered. Consequently, the packing will be compressed laterally against the plug stem 26 and will not bear longitudinally thereon in a direction tending to hold the plug 24 to its seat.

Suitable means may be provided for introducing lubricant under pressure to the seating surface. To this end, the valve seat 14 is provided with circumferential grooves 42 above and below the fluid passageway 12 and longitudinal grooves 44 located on either side of the passageway and terminating short of connection with the circumferential grooves. The plug member 24 may be provided with a plurality of upper and lower dwarf grooves 46 which serve to connect the longitudinal and circumferential grooves when the plug member is in full open and full closed position. The upper dwarf grooves 46 are connected with a lubricant duct 48 extending laterally across the larger end of the plug 24 and intersecting a lubricant reservoir 50 extending axially of the plug stem 26. The lubricant reservoir 50 may be threaded for the reception of the compressor screw 52 by means of which lubricant in the reservoir may be placed under pressure. In order to prevent reflux of lubricant when the compressor screw 52 is removed a suitable check valve 54 may be housed therein adjacent the lower end thereof.

It will be apparent that operation of the compressor screw to force lubricant under pressure to the tapered seating surfaces of the valve will tend to lift the plug member 24 from its seat due to the vertical component of pressure set up between the longitudinal grooves 44 and the valve seat 14. In this invention means have been provided to prevent such lifting of the plug member 24 from its seat while at the same time minimizing the friction of the plug retaining means against turning of the plug member.

If the plug member is held to its seat by means bearing on the stem it will be apparent that the small area over which the thrust is exerted will reduce the friction to a minimum. Also if the thrust so applied is exerted through the medium of an anti-friction bearing the conditions will approach the ideal for reducing the turning moment. On small size valves the anti-friction bearing may be found unwarranted in view of the added expense and a plain bearing may be utilized. However, for the purpose of the description the application of an anti-friction bearing to the stem will be set forth in detail.

Accordingly, the plug stem 26 is reduced as at 56 to provide a shoulder 58 immediately beyond the gland 34. Loosely mounted on stem portion 56 and seated on the shoulder 58 is a collar 60 which, being of larger diameter than the stem 26, serves to enlarge the seating capacity thereof and forms an adequate support for an anti-friction bearing 62. The bearing 62 and collar 60 are housed within a recess 64 formed in the under surface of a yoke member 66 loosely mounted on the stem portion 56 with the bottom of the recess 64 engaging the bearing 62. The yoke member 66 is preferably provided with a substantially elliptical flange portion 68 perforated adjacent the ends of its major axis for the reception of securing studs 70 projecting from the cover 18. The studs 70 are provided with adjusting nuts 72 by means of which pressure may be exerted on the yoke 66 which, acting through the bearing and shoulder 58, will thus adjust the plug member 24 in its seat as will be apparent. Suitable securing means such as the cotter pins 74, or lock washers, may be employed to lock the nuts 72 in adjusted position on the studs 70.

Leakage of lubricant from the bearing 62 and the entrance of foreign matter thereto may be prevented by the provision of packing rings 76 inserted in suitable recesses formed in the inner periphery of the collar 60 and yoke 66 and projecting therefrom into engagement with the reduced portion 56 of the plug stem above and below the bearings 62.

The stem 26 extends beyond the yoke 66 and is provided with a polygonal contour 77 for the reception of a wrench whereby the plug may be rotated in its seat. Preferably this rotation of the plug from full-closed to full-open position or vice versa is limited to a ninety degree movement. To this end, the upper face of the yoke 66 is provided with a pair of upstanding lugs 78 oppositely disposed thereon and cooperating with a stop collar 80 suitably bored to receive the polygonal portion 77 of the plug stem and having a projecting lug 82 adapted to engage one or the other of the lugs 78 when the plug is rotated from one position to another.

Figure 3:
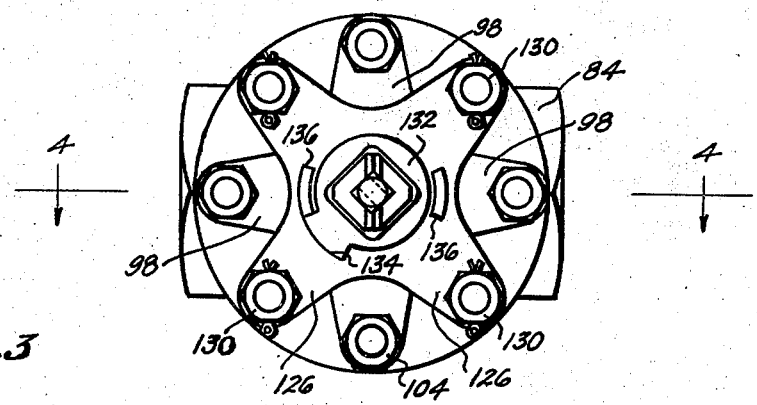
Fig. 3 is a plan view of a valve embodying an alternative form of the invention and Fig. 4 is a section taken on the line 4—4 of Fig. 3 and looking in the direction indicated by the arrows.
Figure 4:
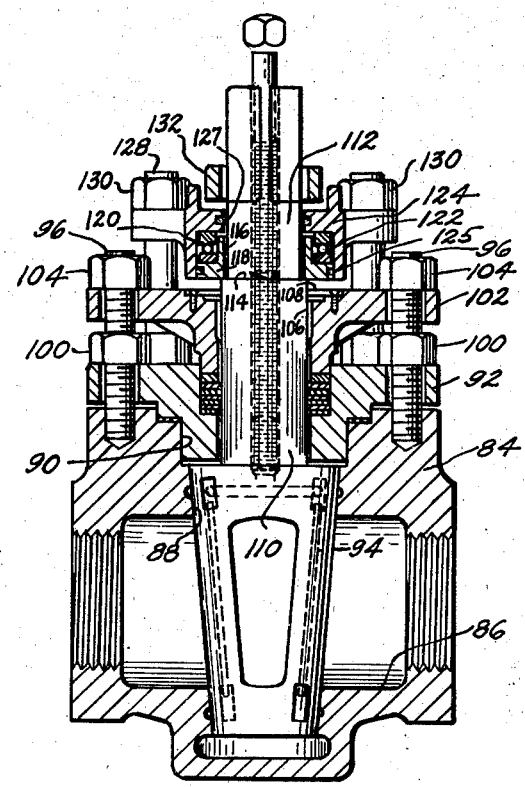

In the embodiment shown in Figs. 3 and 4 a body 84 is provided with the usual fluid passageway 86 and a transverse tapered valve seat 88. The larger end of the valve seat 88 is provided with a stepped recess 90 for the reception of a cover 92. In this instance a tapered plug member 94 similar to that described in the previous embodiment (Figs. 1 and 2) may be employed and both the plug member and body may be provided with cooperating lubricant grooves in the seating surfaces similar to those previously described herein.

In this instance, the cover 92 is preferably of annular form, is mounted loosely on a stem 110 projecting from the plug and is secured to the body 84 by means of studs 96 carrying nuts 100 for this purpose intermediate their ends. A packing gland 102 having a plurality of, in this instance four, equally spaced perforated ears 98 through which the studs 96 project is mounted loosely on the plug stem 110. Suitable nuts 104 threadedly engage the studs 96 for adjusting the gland independently of the cover 92. In this instance the entrance of foreign matter into the stuffing box is prevented by the provision of a dust plate 106 and cover 108 secured to the upper surface of the gland 102 and closely engaging the stem 110.

As in the previous embodiment the stem 110 is provided with a reduced portion 112 immediately above the gland 102 and defining a shoulder 114 on the stem. Seated on the shoulder 114 is a bushing 116 having an annular flange 118 projecting therefrom and forming a seat for an anti-friction bearing 120. The bearing and bushing are housed within a recess 122 formed in the underside of a yoke member 124. The periphery of the annular flange 118 is provided with a groove within which a packing ring 125 is housed and projecting into sealing engagement with the wall of the recess 22 below the bearing. A similar groove containing a packing ring 127 is formed in the yoke above the bearing to form a seal with the stem.

In this embodiment the yoke member is provided with a plurality of, in this instance four, equally spaced perforated ears 126 located alternately with respect to the ears 98 of the gland 102. Such a construction permits studs 128 to extend from the cover 92 beyond the gland 102 and through the ears 126 and carry nuts 130 by which the yoke 124 may be adjusted in position. As in the previously described embodiment the end of the plug stem may be of polygonal form and carry a collar 132 having a lug 134 which cooperates with upstanding lugs 136 formed on the yoke 124 to limit the rotation of the plug to a ninety degree movement.

In both of the herein described embodiments of the invention the plug member is maintained permanently seated by the thrust element. There is no separation between the plug and its seat due to lubricant or line pressure lifting the plug and consequently the seating surfaces are preserved in good condition. The thrust element bears on the plug stem which is of comparatively small area and the friction against turning is thereby kept at a minimum. If the anti-friction bearing as described is used at this point it will be apparent that the turning moment will be low and little lubricant will be necessary to adequately lubricate the valve.

There is no downward thrust exerted by the packing or other elements of the valve and it is retained in its seat solely by the thrust element bearing on the stem. The packing is not subjected to varying degrees of pressure due to alternate lifting and seating of the plug but is maintained under a pressure suitable for the sole purpose of preventing leakage. The packing is therefore preserved in good condition to fulfill its proper function.

I claim:

1. In a lubricated plug valve, a body member having a fluid passageway therethrough and a valve chamber provided with a tapered seating surface, a rotatable valve member seated in said chamber and provided with a cooperating seating surface, means for distributing lubricant under pressure between the seating surfaces, a cover rigidly secured to said body overlying said valve member but out of contact therewith, a stem extending from the larger end of said valve member and projecting beyond said cover, packing in said cover, means to compress said packing radially against said stem, a yoke member operatively connected to the projecting end of the stem beyond said cover, means associated with said yoke for exerting a continuous axial thrust upon said valve member tending to urge said member against its seat, said means being adjustable for maintaining the valve member seated and freely rotatable under pressure of the fluid in said passageway, the thrust exerted by said means being otherwise counteracted solely by contact of the valve member and seat, and an anti-friction element interposed between said yoke and stem.

2. In a lubricated plug valve, a body member having a fluid passageway therethrough and a valve chamber provided with a tapered seating surface, a rotatable valve member seated in said chamber and provided with a cooperating seating surface, means for distributing lubricant under pressure between the seating surfaces, a stem extending from the larger end of the valve member and defining a shoulder thereon, a cover rigidly secured to the body overlying the shoulder but out of contact therewith, said cover having an annular recess surrounding the stem and forming a stuffing box therefor, packing in said stuffing box, a gland adjustable on the stem lengthwise of the cover for compressing the packing in the stuffing box to force it radially against the stem, a reduced portion on the stem defining a shoulder beyond the gland, a yoke member operatively connected with the stem shoulder, means extending from said cover and cooperating with said yoke for exerting a continuous axial thrust upon said valve member tending to urge said member against its seat, said means being adjustable for maintaining the valve member seated and freely rotatable under pressure of the fluid in said passageway, the thrust exerted by said means being otherwise counteracted solely by contact of the valve member and seat, and an anti-friction element interposed between said yoke and the stem shoulder.

JOSEPH E. ADERHOLD, Jr.